United States Patent [19]
Corey, III

[11] 3,850,526
[45] Nov. 26, 1974

[54] OPTICAL METHOD AND SYSTEM FOR MEASURING SURFACE FINISH

[75] Inventor: Harry S. Corey, III, Oak Ridge, Tenn.

[73] Assignee: The United States of America as represented by the United States Atomic Energy Commission, Washington, D.C.

[22] Filed: Mar. 16, 1973

[21] Appl. No.: 342,131

[52] U.S. Cl. ............... 356/109, 356/51, 356/209, 250/571
[51] Int. Cl. ......................................... G01b 9/02
[58] Field of Search ........... 250/338, 339, 571, 572, 250/574; 73/105; 331/94.5; 356/51, 109, 210, 103, 209, 212

[56] References Cited
UNITED STATES PATENTS

| | | | |
|---|---|---|---|
| 2,604,809 | 7/1952 | Mitchell | 356/120 |
| 3,388,259 | 6/1968 | Flower | 356/212 |
| 3,591,291 | 7/1971 | Greer et al. | 356/212 |

OTHER PUBLICATIONS

Munnerlyn et al., Rough Surf. Interfer. using a $CO_2$ laser, Applied Optics, Vol. 7, No. 9, Sept. 1968, pp. 1858-9.

Primary Examiner—Ronald L. Wibert
Assistant Examiner—Conrad Clark
Attorney, Agent, or Firm—John A. Horan; David S. Zachry; David E. Breeden

[57] ABSTRACT

A method and system for measuring surface finish of relatively smooth machined parts having a surface roughness in the range of from about 10 to 80 microinches AA (arithmetical average) have been provided which make use of specularly reflected diffraction patterns generated by an infrared light source directed onto the part surface to be measured at an oblique angle of incidence to provide a direct measurement of the surface roughness. In one embodiment, at least one infrared detector is selectively positioned to read the reflection values of the diffraction pattern and the integrated value of the readings are compared with a calibration curve to obtain the surface finish value. In another embodiment of the invention the surface roughness is measured by the difference in the output signal levels from a detector or detectors set to detect the primary and secondary diffraction pattern reflection lobes. The ratio of the intensity of the primary lobe and the first adjacent secondary lobe is a direct measure of the surface roughness.

10 Claims, 15 Drawing Figures

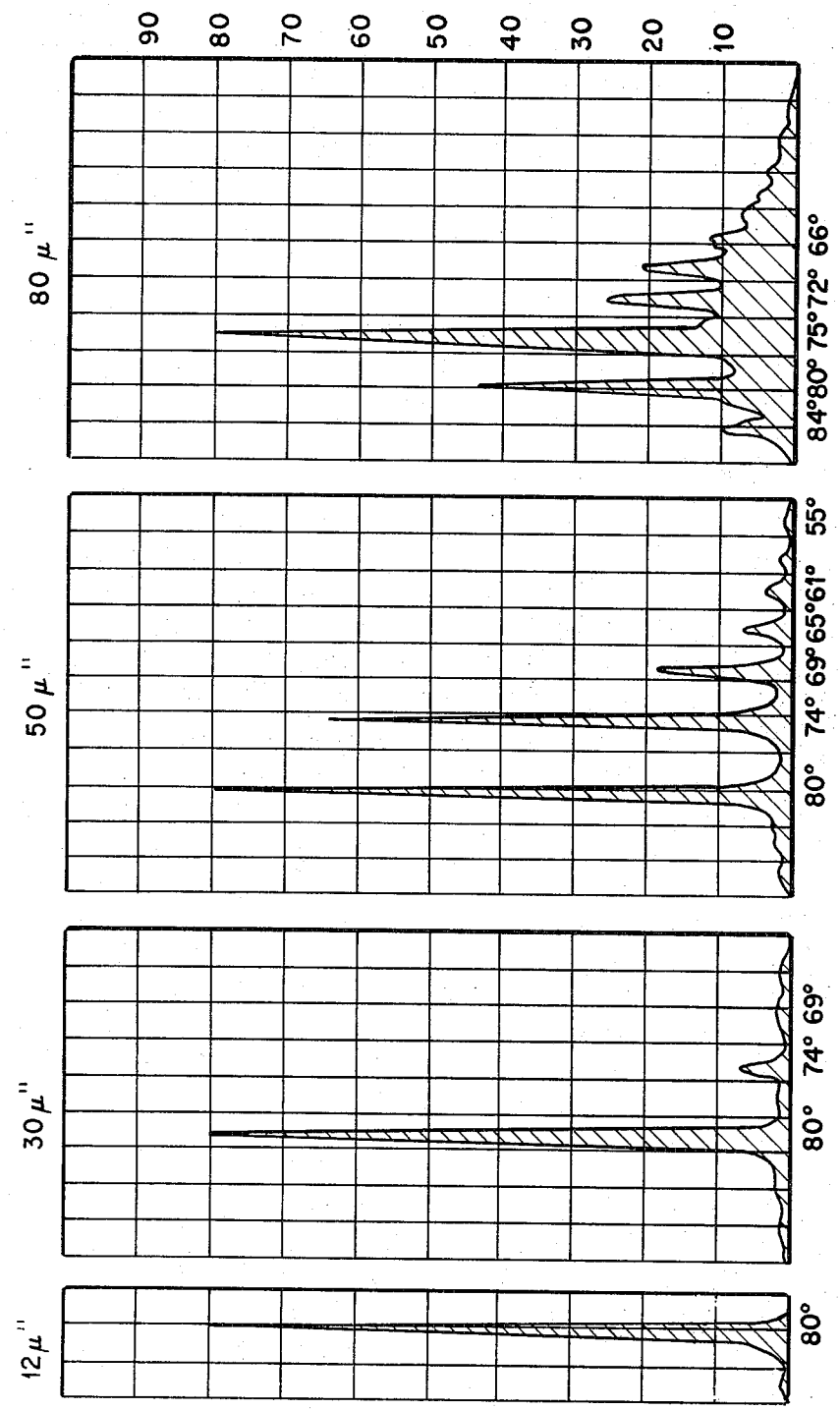

OPTICAL METHOD AND SYSTEM FOR MEASURING SURFACE FINISH

BACKGROUND OF THE INVENTION

The present invention was made during the course of, or under, a contract with the United States Atomic Energy Commission.

The invention relates generally to systems for measuring roughness of a relatively smooth machined surface and more specifically to a method and apparatus for measuring the roughness of a relatively smooth surface by optical means.

The vast improvements in machine design and technology have created a need for accurate on-line measurement and control of surface finish. Measurement of the surface finish during the machining operation would provide immediate detection of surface finish during the machining operation and would provide a more precise part having a uniform surface finish.

In the prior art, the most common method of surface finish measurement is done with a stylus instrument. A stylus is moved across a surface and the stylus movement perpendicular to the lay direction of the finish is amplified and averaged. Some stylus instruments provide a direct meter reading of the surface finish and some chart the surface profile. The disadvantage of the stylus instruments is that the stylus may damage superfinish surfaces and the measurement must be made after the part is removed from the machine.

Other quantitative measurements have generally been made by optical interference microscopes. Although these instruments have provided accurate measurements, they are of the most part rather delicate instruments which require skilled operators and restrict measurements to laboratory environments.

Various qualitative measurement methods have been used in the past which range from visual comparison of the workpiece with a specimen block of known roughness, to instruments that measure how a surface will react under simulated working conditions. Some of these methods are microscopic comparison which is a direct visual comparison of the surface to a specimen surface with the aid of a microscope. Various photoelectric devices such as a Glossmeter which measures the reflected light from a surface as an indication of surface finish have also been used. The surface roughness changes the amount of light which can be refocused upon a detector since irregularities on the surface cause scattering of the reflected rays. A photocell and meter are used to indicate the change in current or voltage caused by the roughness of the work surface.

Another similar instrument is the Surface Replica Analyzer in which a wax or cellulose replica of a surface is oscillated between a light source and a photocell. Variations in surface roughness cause the light intensity reaching the photocell to vary; this, in turn, affects the current generated in the photocell circuits, and it is this variation that is used as a measure of the surface roughness.

Although various optical methods for measuring surface roughness have been suggested, there is a need for a system which provides a simple means of quantitative measurement of the surface roughness which is amenable to on-line measurement of the surface finish of parts while the part is mounted in place for machining.

SUMMARY OF THE INVENTION

In view of the above need, it is an object of this invention to provide an optical method of measuring surface roughness from specular reflected diffraction patterns which is simple to perform and amenable to on-line measurement of the surface finish of a machined part.

Another object of this invention is to provide an apparatus for implementing the method of the above object.

Further, it is an object of this invention to provide a system for optical measurement of the surface finish of relatively smooth machined surfaces wherein a monochromatic beam of infrared light is directed upon the surface at an oblique angle of incidence which produces a specular reflected diffraction pattern and the intensities of the diffraction pattern are recorded and compared with recorded diffraction pattern intensities from corresponding surfaces of known roughness to determine the roughness of the part surface.

Yet another object of this invention is to provide a system for optical measurement of surface finish of relatively smooth machined surfaces including a source of monochromatic, coherent infrared light directed upon the surface at an oblique angle of incidence which produces a specular reflected diffraction pattern having a primary reflection lobe and at least one secondary reflection lobe; a pair of infrared detectors, one positioned to record the intensity of light from said primary lobe and another positioned to record the intensity of light from said secondary lobe and means for obtaining the ratio of the second lobe intensity to the first intensity as a direct measure of the surface roughness.

Other objects and many of the attendant advantages of the present invention will be obvious from the following detailed description taken in conjunction with the drawings.

BRIEF DESCRIPTION OF THE DRAWINGS

FIGS. 9–12 are strip chart recordings of reflection patterns from standard surface finish blocks taken with the device shown in FIG. 8.

DETAILED DESCRIPTION

The problems of reflecting light waves and other electromagnetic waves from a periodic surface, such as a machined part having a roughness due to the parallel extending lay marks from a cutting tool, have been investigated analytically by various scientists in the past. A discussion of the analysis may be had by referring to "The Scattering Of Electromagnetic Waves From Rough Surfaces," by Beckman, Petr and Spizzichina, *International Series of Monographs on Electromagnetic Waves*, vol. 4, pp. 34–69, 1963.

It is generally concluded, as pointed out in the above reference, that any periodic surface will reflect specularly regardless of its period if the wave length of the incident radiation is larger than the surface roughness or the angle of incidence is quite large.

It will be understood that throughout this specification the term "surface roughness" or roughness of the surface refers to the height of the finely spaced surface irregularities of the predominant surface pattern created by a cutting tool. The height is measured in microinches arithmetical average (AA).

Figure 1:
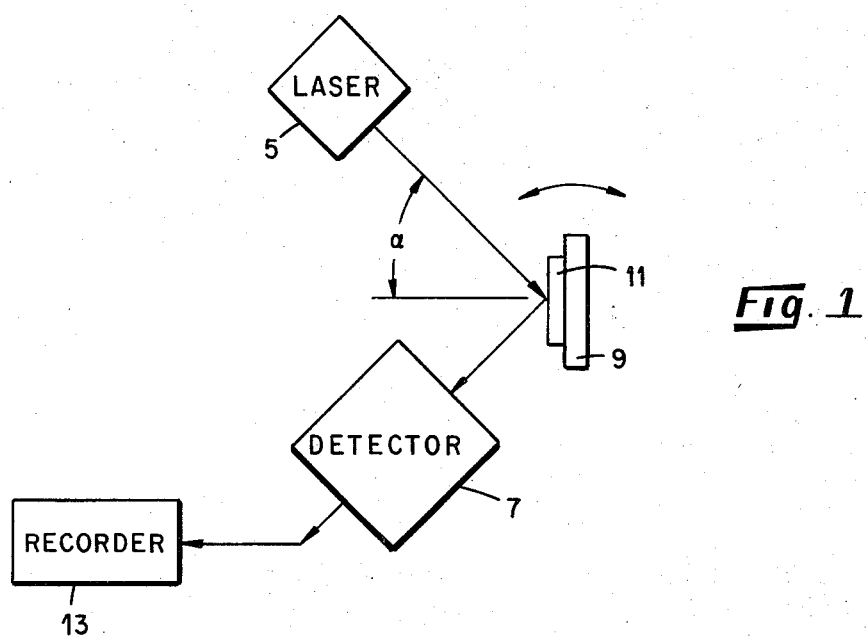
FIG. 1 is a schematic diagram of one embodiment of an optical system for measuring surface finish according to the present invention.

With this information in mind and knowing the roughness of the machined surfaces which it would be desirable to measure is generally in the range of from about 10 to 80 microinches, an experiment was set up, as depicted in FIG 1, using an infrared laser light source 5 having a wave length of about 3.39 micrometers. The light source 5 is disposed so as to direct a beam of light onto a block 11 held by a rotatable mount 9. An infrared detector 7 is positioned to receive light reflected from block 11 and has an electrical signal output connected to a strip chart recorder 13. Although other infrared light sources in the wave length of from 2 to 10 micrometers and various detectors may be used, as will be pointed out below, it was necessary to use a radiometric microscope with the particular 3.39 infrared laser source to provide enough sensitivity to make a detailed analysis of the obtained patterns.

Experimentation began using a number of standard specimen blocks 11 and the light source directed thereon at an angle of incidence ($\alpha$) of 45°. Reflection patterns were generated by rotating the standard blocks 11 of various roughness attached to the mount 9 through an angle of approximately 10° centered about the 45° angle of incidence in very small incremental steps. The blocks used in the experiment were made of nickel with surface finishes ranging from about 2 to 100 microinches. It was noted that the reflectance from most of the blocks (2 to 16 microinches) was a simple specular pattern noted by the peak reflections recorded at an angle of reflectance equal to the angle of incidence as the blocks were rotated. However, a scatter pattern, indicating diffraction, emerged for the standard blocks with a surface finish to from 16 to 32 microinches. Although there was an obvious visual difference in the reflection patterns for blocks 16 to 32 microinches, it was felt that it would be difficult to assign numerical values to the data. Also, there was no discernible difference in the patterns produced for surfaces rougher than about 32 microinches.

Following the above experiment, the angle of incidence, $\alpha$, was decreased to near the normal angle of incidence and a new set of curves was generated as above. With these new curves it was possible to visually distinguish between 32 and 64 microinch surfaces, but no quantitative improvements were noted.

The experimental setup was again modified to increase the angle of incidence ($\alpha$) to 80° and the same procedure was repeated. The new set of curves was dominated by a limited number of well-defined peaks, which is characteristic of diffracted light. Also, resolution was extended to greater than 80 microinches, and the area of the recorded curves appeared to be a function of the surface finish.

Further experimentation demonstrated that if the gain were adjusted so that the predominant lobe of the diffraction pattern, of each of the samples was made numerically equal, and if the samples were rotated through the same angle in the same period of time, the area of these curves appeared to be directly proportional to the surface finish. Typical curves generated by the various known surface finishes are shown in FIGS. 2–6.

Figure 7:
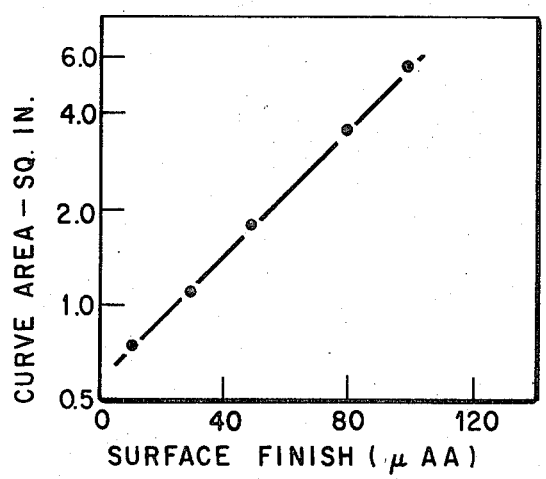
FIG. 7 is a calibration curve obtained by plotting recorded area of the patterns of FIGS. 2–6 versus surface finish in microinches AA.

The area of these generated curves was measured and plotted against the surface finish of the various blocks, as shown in FIG. 7. As can be seen from this plot, the surface finish is directly proportional to the leg of the area under the generated curves.

Figure 8:
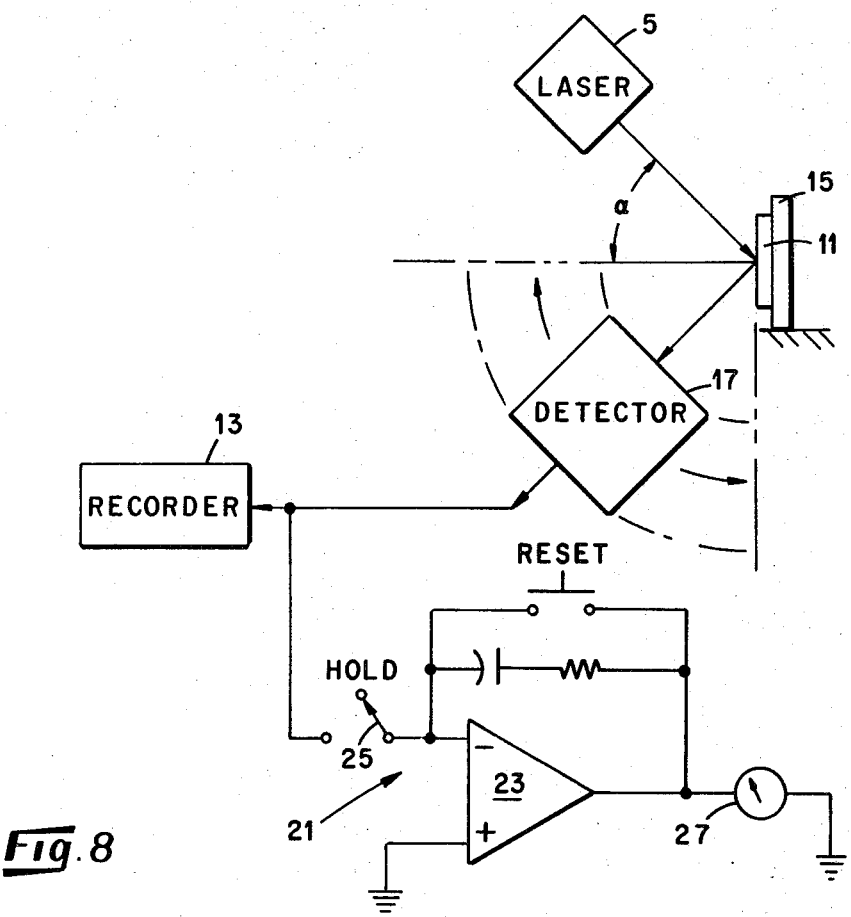
FIG. 8 is a schematic diagram of another embodiment of an optical system for measuring surface finish according to the present invention.
Figure 2:
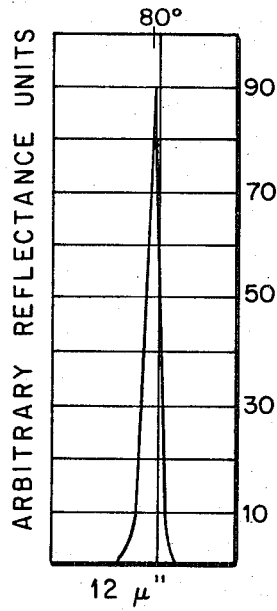
FIGS. 2–6 are strip chart recordings of reflection patterns from standard surface finish blocks taken with the device shown in FIG. 1.
Figure 3:
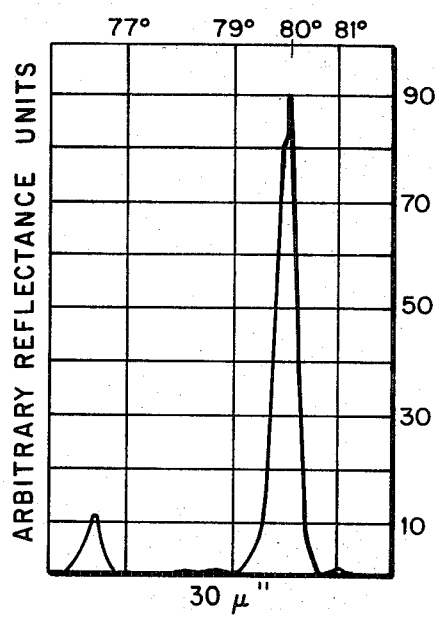
Figure 4:
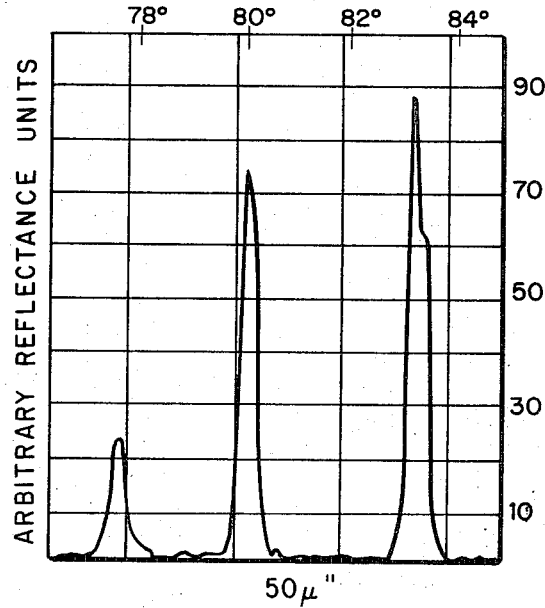
Figures 5, 6:
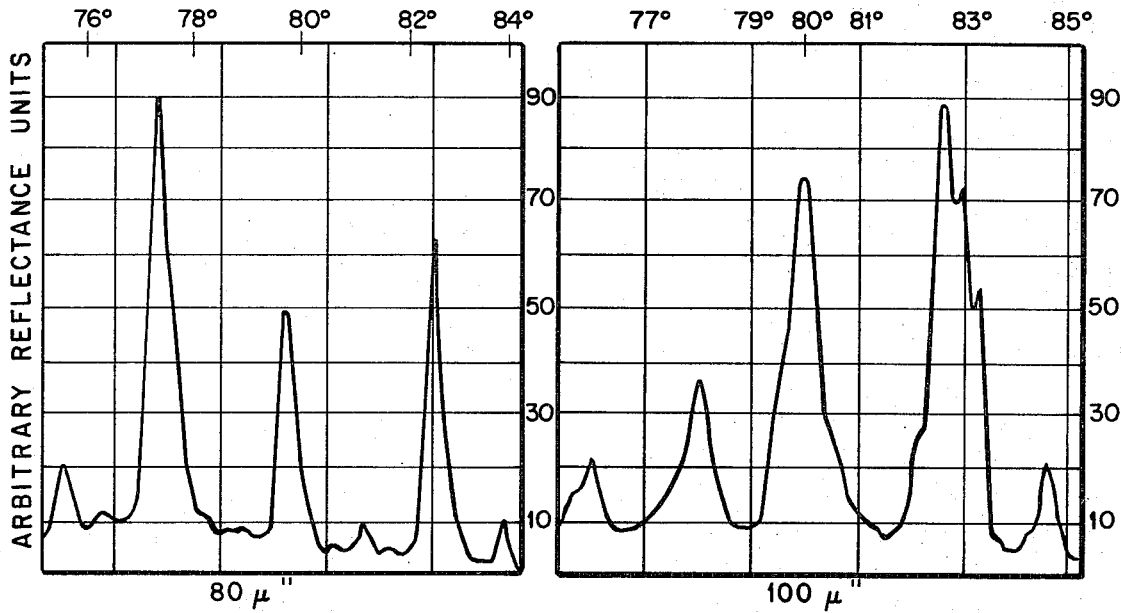

Although the above method demonstrates that the surface finish of machined parts can be measured optically, it does not provide a means which is amenable to on-line measurement of part surface finish. Additional experiments were undertaken to provide a system which does not require the rotation of the part surface to be measured, which obviously would be impractical for most parts while mounted on a machine. As shown in FIG. 8, the detector 17 is mounted to pivot about an axis at the point of incidence of the laser beam on the block 11 so that the entire diffraction pattern could be detected. While holding a fixed angle of incidence ($\alpha$) of 80°, the detector was rotated from the normal angle of reflectance to 90° to survey the entire diffraction pattern. The pattern for blocks 11 having surface finishes 12, 30, 50 and 80 microinches AA were recorded on the strip chart recorder 13 as before except that the surface being measured remained stationary and the detector 17 was rotated. Typical curves generated by the various known surface finishes are shown in FIGS. 9–12. In order to eliminate the variables of normal reflectance and to compensate for variances in the light source, the height of the predominant peak for each of the standard blocks was adjusted electronically by adjusting the detector gain to a selected height, typically 80 percent of the full scale deflection of the recorder 13. The area under the curves plotted on recorder 13 was calculated by means of an integrator circuit 21 connected to the gain adjustment amplifier output of the detector 17 to construct a calibration curve, FIG. 13, which indicated as before that the areas were proportional to surface finish.

The integrator circuit 21 is of conventional design wherein an operational amplifier 23 is provided with a series RC feedback line connected between the output of amplifier 23 and its signal inverting input (−) which is further connectd to receive the input signal through a hold switch 25. The output is connected to a volt meter 27 which registers the integrated value proportional to the area under the curve plotted on recorder 13.

Figure 13:
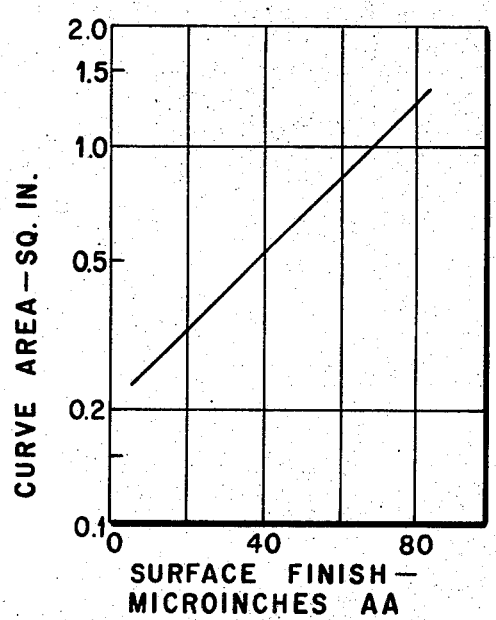
FIG. 13 is a calibration curve obtained by plotting the recorded area of the patterns of FIGS. 9–12 versus surface finish in microinches AA.

Following the construction of the calibration curve of FIG. 13, a block of steel having an unknown surface finish was fastened to the mount 15. The method previously described in the construction of the calibration curves was used to obtain the area representing the light reflected from the unknown surface finish. The total area was determined to be 0.562 square inch which is equivalent to a surface finish of 43 microinches AA as obtained from FIG. 13.

For comparison, the surface finish of the steel block was measured on a Clevite Surfanalyzer (stylus type instrument). With this instrument, a surface finish of 45 microinches AA was obtained. The difference, 2 microinches AA, in the two methods of measurement represents about 5 percent.

Figure 14:
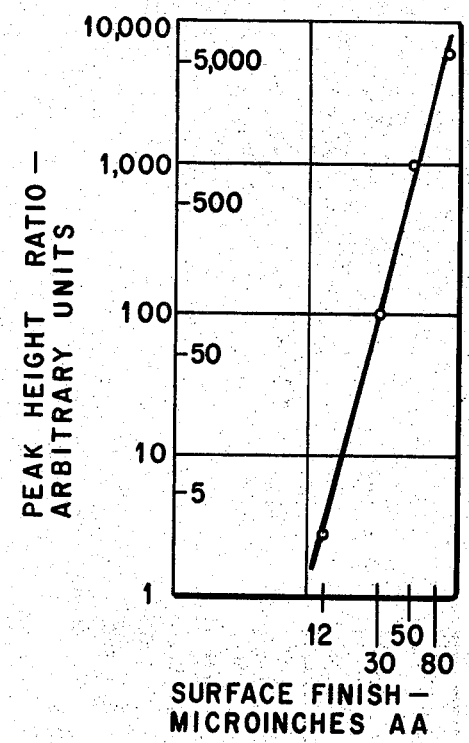
FIG. 14 is a calibration curve obtained by plotting the peak height ratios of the secondary to primary reflection lobes of the reflection patterns of surface finish measurement according to this invention versus surface finish in microinches AA.

Yet further experimentation revealed that measurements could be made without rotating the sample or any other part of the equipment. It was observed that the diffraction pattern from each of the standard blocks 11 demonstrated well-defined primary reflectance peaks or lobes located at fixed angles with the infrared beam directed onto the blocks at an angle of between about 75° and 85°. By trial and error experimentation, it was discovered that the difference in amplitude of the recorded detector signal of the primary reflection lobe and the adjacent lobe was related to surface finish. A linear curve was produced by plotting a log-log graph of the ratio of the second and first primary peaks against the surface finish of the standard blocks (12, 30, 50 and 80 microinches AA). A plotted curve of the peak height ratios versus surface finish taken from meter readings, which proved to be more accurate than the values taken from the strip chart recordings, are shown in FIG 14. The ratio of the second to first peak heights for 12, 30, 50 and 80 microinch surface finish standard blocks were 2.8, 100, 980 and 4300, respectively.

Figure 15:
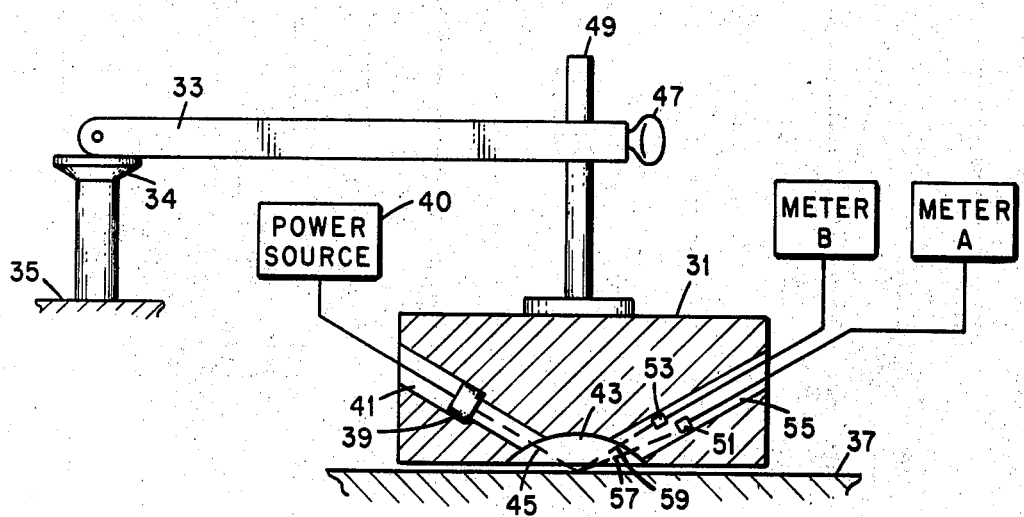
FIG. 15 is a schematic diagram of yet another embodiment of this invention for optical surface finish measurement which can be readily mounted on a machine for measuring the surface finish of a part mounted for machining.

Referring now to FIG. 15, there is shown schematically a device constructed according to one embodiment of the present invention for measuring the surface finish which can be mounted on a lathe, for example, to measure a part surface on-line. A housing 31, shown in cross section, is mounted by means of a hinged support arrangement 33 to the machine tool carriage 35, for example, so that the device may be readily moved into position closely adjacent a part surface 37 to be gauged. The housing is positioned so that the light from a light source, such as an infrared light emitting diode (LED) 39 electrically connected to a power source 40, is directed onto the surface 37 in a plane perpendicular to the surface lay. Various infrared light sources may be used.

The LED 39 is mounted in a channel 41 which passes through the housing 31 at an angle of about 10° with the lower portion of housing 31. The channel 41 opens into a recessed portion 43 of housing 31 wherein the light beam represented by dashed line 45 may be directed onto the part surface at an angle of incidence of about 80° when the housing is moved into position with the lower surface of the housing parallel with the part surface and adjusted in a direction normal to the surface 37 by means of adjusting drives a support rod 49 fixed to housing 31, as indicated by the arrows, and thereby adjusts the angle of incidence of the beam 45 onto the part surface 37.

A pair of infrared detectors 51 and 53 are mounted in an opposing channel 55 which has an opening aligned such that the reflected diffraction pattern primary lobe 57, which has an angle of reflection identical to the angle of incidence of beam 45, is directed onto a first one of the detectors, detector 51, while the first secondary reflection lobe 59 is directed onto the second detector 53.

It will be noted in referring to FIGS. 9–11 that the primary lobe is always at an 80° angle of reflection equal to an 80° angle of light beam incidence and the first secondary lobe is positioned at an angle of reflectance of about 6° less (74°) than the primary lobe. Therefore, the position of the second detector 53 is fixed to view a reflectance path of 6° less than that of the primary lobe detector 51. It is the ratio of these two reflectance values that is directly proportional to the surface finish.

The output of detector 51 is connected to a volt meter A while the output of detector 53 is connected to an identically scaled volt meter B. The ratio value of the meter reading of B divided by the meter reading of A is obtained, and from the calibration curve of FIG. 14 the surface finish is obtained as described above.

In operation, the housing 31 is moved into position adjacent the part surface 37 by swinging the hinged support 33 into position against a stop 34. The light source 39 is turned on and the housing vertical position is adjusted by turning knob 47 until the meter A, connected to detector 51, registers a maximum reading at the 80° angle of reflectance corresponding to an 80° angle of incidence of the beam 45. Both meters A and B readings are recorded, the ratio B/A is calculated and the value of the surface finish is taken from the calibration curve of FIG. 14 by locating the ratio value on the curve and reading the corresponding surface finish value.

The device shown in FIG. 15 is not limited to flat surfaces, such as 37, but may also be used on various shaped surfaces as long as the light source may be adjusted to strike the surface point of interest at an angle of incidence of 80°.

While the invention has been described by way of specific illustrations it will be obvious to those skilled in the art that various modifications and changes may be effected therein without departing from the scope or spirit of the invention as set forth in the following claims attached to and forming a part of this specification.

What is claimed is:

1. An optical method for measuring roughness of a machined part surface having periodic surface irregularities of a roughness within a known range, comprising the steps of:
    directing a beam of monochromatic, coherent light of a wave length greater than the roughness of said surface onto said surface at a fixed oblique angle of incidence in a plane normal to the lay direction of said periodic surface irregularities so as to produce a diffraction pattern of specular reflectance of said beam from said surface;
    recording the intensities of said diffraction pattern at predetermined angles of reflectance so that the predominant lobe of said pattern is recorded at a preselected amplitude;
    comparing said recorded intensities with identically recorded diffraction pattern intensities from standard surfaces of known roughness at said predetermined angles of reflectance to determine the roughness of said workpiece surface.

2. The method as set forth in claim 1 wherein said light beam is an infrared light beam, the known range of surface roughness is from about 10 to 80 microinches, said oblique angle of incidence is in the range of from 75° to 85°.

3. The method as set forth in claim 2 wherein said recording and comparing steps include the steps of:
   plotting a curve of the recorded intensities of said diffraction pattern through angles of reflectance of between 50° and 80°;
   computing the area beneath said curve; and
   comparing the computed area with computed area values from said standard surfaces to determine the roughness of said workpiece.

4. The method as set forth in claim 2 wherein said recording and comparing steps include the steps of recording the reflectance value of said diffraction pattern at an angle of reflectance equal to the angle of incidence of said light beam corresponding to a primary reflectance lobe of said diffraction pattern;
   recording the reflectance value of said diffraction pattern at an angle of reflectance of about 6° less than the angle of reflectance of said primary lobe corresponding to a secondary reflectance lobe of said diffraction pattern;
   computing the ratio of said recorded reflectance values of said secondary lobe to that of said primary lobe; and
   comparing the computed ratio value with ratio values computed from corresponding measurements of said standard surfaces to determine the surface finish of said workpiece.

5. A device for measuring the roughness of a machined workpiece surface having periodic surface irregularities of a roughness within a known range, comprising:
   a source of monochromatic, coherent light having a wave length substantially greater than the roughness of said irregularities of said workpiece surface;

means for directing a beam of said light onto said workpiece surface at a fixed oblique angle of incidence in a plane normal to the lay direction of said periodic surface irregularities so as to provide a specularly reflected diffraction pattern of said light beam from said surface;
   light detecting means for recording the intensities of reflected light of said diffraction pattern at a plurality of angles of reflection to provide an indication of the roughness of said workpiece surface by comparison with identical recordings made from standard surfaces of known roughness.

6. The device as set forth in claim 5 wherein the known range of surface roughness is from about 10 to 80 microinches and wherein said light source is infrared light source.

7. The device as set forth in claim 6 wherein said light directing means includes means for directing said light source beam onto said workpiece surface at an angle of incidence in a range of from about 75° to 85°.

8. The device as set forth in claim 7 wherein said light detecting means includes an infrared light detector which has an electrical signal output proportional to the infrared light intensity received by a sensitive area thereof, means for rotating said light detector about an axis at the point of incidence of said light beam on said workpiece surface, and a signal integrator connected to the output of said infrared light detector for integrating the signal as said infrared detector is rotated through said plurality of angles of reflection so that the integrated signal value is indicative of the roughness of said workpiece surface.

9. The device as set forth in claim 7 wherein said light detecting means includes a first infrared detector having an electrical signal output proportional to the infrared light intensity received by a sensitive area thereof, said first infrared detector disposed so as to view a primary lobe of said diffraction pattern at an angle of reflectance equal to the angle of incidence of said light beam onto said workpiece surface, a second infrared detector, identical to said first detector, disposed so as to view a secondary lobe of said diffraction pattern at an angle of reflectance of about 6° less than the angle of reflectance of said primary lobe and means connected to the output of said first and second infrared detectors for separately recording the output signals of said first and second infrared detectors, whereby the ratio of the amplitude of the signal from said second detector to the amplitude of the signal from said first detector is indicative of the roughness of said workpiece surface.

10. The device as set forth in claim 9 wherein said infrared light source has a wave length in the range of from 2 to 10 micrometers and said angle of incidence of said light beam onto said workpiece surface is 80°.

* * * * *